(12) United States Patent
Jeong et al.

(10) Patent No.: US 12,474,060 B2
(45) Date of Patent: Nov. 18, 2025

(54) COOKING APPARATUS AND CONTROL METHOD THEREOF

(71) Applicant: SAMSUNG ELECTRONICS CO., LTD., Suwon-si (KR)

(72) Inventors: Jinho Jeong, Suwon-si (KR); Woojoo Kim, Suwon-si (KR); Dongmyeong Lee, Seoul (KR); Juhyun Lee, Suwon-si (KR); Sooncheol Kweon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 382 days.

(21) Appl. No.: 17/840,695

(22) Filed: Jun. 15, 2022

(65) Prior Publication Data

US 2022/0325896 A1    Oct. 13, 2022

Related U.S. Application Data

(63) Continuation of application No. PCT/KR2022/005215, filed on Apr. 11, 2022.

(30) Foreign Application Priority Data

Apr. 13, 2021  (KR) .......................... 10-2021-047946
Feb. 18, 2022  (KR) .......................... 10-2022-021468

(51) Int. Cl.
*F24C 7/08*   (2006.01)
*A47J 36/32*  (2006.01)
*F24C 3/12*   (2006.01)

(52) U.S. Cl.
CPC ............... *F24C 7/085* (2013.01); *A47J 36/32* (2013.01); *F24C 3/128* (2013.01); *F24C 7/087* (2013.01)

(58) Field of Classification Search
CPC . F24C 7/085; F24C 3/128; F24C 7/087; A47J 36/32; G06Q 50/10; H05B 6/12
See application file for complete search history.

(56) References Cited

U.S. PATENT DOCUMENTS

| 9,644,847 B2 | 5/2017 | Bhogal et al. |
| 10,024,544 B2 | 7/2018 | Bhogal et al. |

(Continued)

FOREIGN PATENT DOCUMENTS

| JP | 2014-77581 A | 5/2014 |
| JP | 2018-534514 | 11/2018 |

(Continued)

OTHER PUBLICATIONS

International Search Report dated Jul. 8, 2022 in International Patent Application No. PCT/KR2022/005215 (3 pages; 4 pages English translation).

(Continued)

*Primary Examiner* — Wesley J Tucker
(74) *Attorney, Agent, or Firm* — STAAS & HALSEY LLP

(57) ABSTRACT

A cooking apparatus including a cooking chamber, a camera configured to photograph inside of the cooking chamber, a communication interface, a memory configured to store a cooking method, and a processor configured to, based on food being selected, drive the cooking chamber based on a cooking method corresponding to the selected food, control the camera to photograph the food inside the cooking chamber, and control the communication interface to transmit a photographed image of the food to a user terminal device. The processor is configured to, based on a first feedback related to the photographed image being received, provide a plurality of images for selecting additional cooking states for the food to the user terminal device, and based on a second feedback related to the photographed image (Continued)

being received, provide a plurality of menus for analyzing a cause of a cooking state of the food to the user terminal device.

14 Claims, 18 Drawing Sheets

(56) References Cited

U.S. PATENT DOCUMENTS

| | | | |
|---|---|---|---|
| 10,739,013 B2 | 8/2020 | Bhogal | |
| 10,760,794 B2 | 9/2020 | Cheng | |
| 11,212,882 B2 | 12/2021 | Takagi | |
| 11,250,714 B2 | 2/2022 | Lim | |
| 11,674,692 B2* | 6/2023 | Luckhardt | F24C 7/085 |
| | | | 382/100 |
| 2015/0224150 A1* | 8/2015 | Strukov | A61P 3/04 |
| | | | 424/539 |
| 2016/0366314 A1* | 12/2016 | Pfaffinger, Jr. | F24C 7/085 |
| 2017/0079471 A1 | 3/2017 | Riefenstein | |
| 2017/0195542 A1* | 7/2017 | Thomas | F16B 47/00 |
| 2017/0245682 A1* | 8/2017 | Gracia | A47J 37/0635 |
| 2017/0261213 A1* | 9/2017 | Park | H04N 23/57 |
| 2018/0082603 A1 | 3/2018 | Lim et al. | |
| 2018/0292092 A1* | 10/2018 | Bhogal | F24C 7/085 |
| 2018/0324908 A1* | 11/2018 | Denker | H05B 6/6467 |
| 2019/0053332 A1* | 2/2019 | Cheng | F24C 7/046 |
| 2019/0223260 A1 | 7/2019 | Takagi | |
| 2019/0223474 A1* | 7/2019 | Lee | H05B 6/00 |
| 2019/0242584 A1* | 8/2019 | Ebert | A23L 5/10 |
| 2020/0019861 A1 | 1/2020 | Jeong | |
| 2020/0228117 A1* | 7/2020 | Ohno | H03K 17/08122 |
| 2021/0401223 A1 | 12/2021 | Han et al. | |
| 2022/0117274 A1* | 4/2022 | Bhogal | A47J 36/32 |
| 2022/0142400 A1* | 5/2022 | Kim | F24C 3/128 |
| 2022/0311927 A1* | 9/2022 | Ka | F24C 7/085 |
| 2022/0357043 A1* | 11/2022 | Schiffler | H05B 1/0263 |
| 2023/0131893 A1* | 4/2023 | Kaiser | H04N 23/66 |
| | | | 348/373 |
| 2024/0215618 A1* | 7/2024 | Tuli | A23L 5/17 |
| 2025/0160372 A1* | 5/2025 | Tsadka | A23L 13/50 |

FOREIGN PATENT DOCUMENTS

| | | |
|---|---|---|
| JP | 6891897 | 5/2021 |
| KR | 10-1737498 | 5/2017 |
| KR | 10-2018-0032234 | 3/2018 |
| KR | 10-2018-0083167 | 7/2018 |
| KR | 10-2019-0100525 A | 8/2019 |
| KR | 10-2019-0105531 A | 9/2019 |
| KR | 10-2022-0059726 | 5/2022 |
| KR | 10-2022-0098482 | 7/2022 |
| WO | 2017/044876 A1 | 3/2017 |
| WO | 2021/040095 A1 | 3/2021 |

OTHER PUBLICATIONS

Written Opinion dated Jul. 8, 2022 in International Patent Application No. PCT/KR2022/005215 (8 pages).
Extended European Search Report issued on Aug. 5, 2024 by the European Patent Office for European Patent Application No. 22788376.6.

* cited by examiner

COOKING APPARATUS AND CONTROL METHOD THEREOF

CROSS-REFERENCE TO RELATED APPLICATION(S)

This application is a bypass continuation of International Application No. PCT/KR2022/005215, filed on Apr. 11, 2022, which is based on and claims priority to Korean Patent Application No. 10-2021-0047946 filed on Apr. 13, 2021, and Korean Patent Application No. 10-2022-0021468 filed on Feb. 18, 2022, in the Korean Intellectual Property Office, the disclosures of which are incorporated by reference herein in their entireties.

BACKGROUND

1. Field

The disclosure relates to a cooking apparatus and a method for controlling thereof. More particularly, the disclosure relates a cooking apparatus capable of providing a user with an image of food photographed through a camera installed inside the cooking apparatus, and controlling a cooking operation or improving the user's cooking environment by receiving user feedback on the photographed image of the cooked food, and a method for controlling thereof.

2. Description of Related Art

A cooking apparatus is an apparatus configured to cook food. For example, the cooking apparatus may correspond to an oven, an induction cooker, an electric range, a gas range, or the like.

Recently, a service has been developed in which a camera is provided in a cooking apparatus to provide an image of food to be cooked.

However, the prior cooking apparatus only assists a user to monitor a cooking process by displaying a photographed image of food on a display. There is a problem in that the user's need to more actively control the cooking apparatus by reflecting the user's feedback on the photographed image of the food could not be performed.

SUMMARY

According to an embodiment of the disclosure, a cooking apparatus includes a cooking chamber configured to accommodate food, a camera configured to photograph inside of the cooking chamber, a communication interface, a memory configured to store a cooking method, and a processor configured to, based on food being selected, drive the cooking chamber based on a cooking method corresponding to the selected food, control the camera to photograph the food inside the cooking chamber, and control the communication interface to transmit a photographed image of the food to a user terminal device. The processor is configured to, based on a first feedback related to the photographed image being received, provide a plurality of images for selecting additional cooking states for the food to the user terminal device, and based on a second feedback the photographed image being received, provide a plurality of menus for analyzing a cause of a cooking state of the food to the user terminal device.

The processor may, based on the first feedback being received, control driving of the cooking chamber to perform additional cooking according to a cooking state among the additional cooking states corresponding to a selected image among the plurality of images provided to the user terminal device being selected.

The processor may, based on the second feedback being received, update information stored in the memory based on a menu among the plurality of menus provided to the user terminal device being selected.

The update may include at least one of updates for correcting at least one of a cooking time, a cooking temperature, and a cooking pattern included in the cooking method and an update for generating a notification message to be provided at a time of next cooking.

The processor may control driving of the cooking chamber to stop based on a third feedback related to the photographed image being received.

The apparatus may further include a display, and an input device configured to receive user feedback, wherein the processor is configured to control the display to display the photographed image, and control the display to, based on the first feedback being inputted through the input device, display the plurality of images for selecting additional cooking states for the food, and based on the second feedback being inputted through the input device, display the plurality of menus for analyzing the cause for the cooking state of the food.

The processor may, based on the first feedback being inputted, control driving of the cooking chamber to perform additional cooking according to one of the additional cooking states corresponding to the selected image based on one of the plurality of images displayed on the display being selected.

The processor may, based on the second feedback being received, update information stored in the memory based on a menu among the plurality of menus displayed on the display being selected.

The memory may store a plurality of reference images indicating different cooking levels and a cooking method matching each of the plurality of reference images for each food, and wherein the processor is configured to provide the plurality of reference images to the user terminal device, update, based on one of the plurality of reference images being selected, a cooking method stored in the memory according to a cooking level corresponding to the selected reference image, and control the cooking chamber based on the cooking method corresponding to the selected reference image.

The apparatus may further include a laser device configured to irradiate a laser toward the food, wherein the processor is configured to acquire a three-dimensional image of the food using the camera and the laser device, based on the three-dimensional image of the food, identify a food area and a non-food area from the photographed image of the food, and generate a plurality of images for receiving selection of additional cooking states with respect to the food by performing color correction on the food area of the photographed image.

The processor may, based on an image, photographed by the camera, of a linear laser irradiated toward the food through the laser device, acquire three-dimensional spatial coordinates with respect to each of a plurality of areas on the photographed linear laser, and identify an area in which a height value of the three-dimensional spatial coordinate is 0 among the plurality of areas as a non-food area, and identify an area with a non-zero height value as a food area.

The processor may acquire a color value of food corresponding to each of a plurality of areas on the photographed linear laser based on the image photographed by the camera, and compare with an area with a non-zero height value among areas in which the height value of the three-dimensional spatial coordinate is 0, and identify an area where color value is within a predetermined range as a food area.

The processor may match the three-dimensional image of the food and the photographed image of the food and identify an inside of an outer part area of the food identified from the photographed image as the food area.

According to an embodiment of the disclosure, a user terminal device includes a memory configured to store an application for controlling a cooking apparatus comprising a camera for photographing inside of a cooking chamber, a display, a communication interface, and a processor. The processor may be configured to, based on the application being executed, control the display to display a food selection UI for receiving an input related to food to be cooked in the cooking apparatus, and control the communication interface to transmit a control signal corresponding to the input related to the food from the food selection UI to the cooking apparatus, based on a photographed image of the food being received from the cooking apparatus, control the display to display a plurality of menus for receiving input related to the photographed image and feedback related to the photographed image, and based on at least one menu among the plurality of menus being selected, transmit feedback corresponding to the selected menu to the cooking apparatus.

The plurality of menus may include a first menu for requesting additional cooking of the food, a second menu for notifying a failure in cooking of the food, and a third menu for notifying success of cooking of the food.

The processor may control the display to display a plurality of images for selecting additional cooking states based on the first menu being selected, and display failure analysis UI for receiving a cooking failure factor based on the second menu being selected.

The processor may control, based on food being input in the food selection UI, the display to display a plurality of reference images indicating different cooking levels for the input food, and based on one of the plurality of reference images being selected, control the communication interface to transmit a control signal corresponding to the selected reference image to the cooking apparatus.

According to an embodiment of the disclosure, a method of controlling a cooking apparatus comprising a camera for photographing inside of a cooking chamber, the method includes, based on a selection related to food, driving the cooking chamber according to a cooking method corresponding to the selection related to food, photographing the food inside the cooking chamber using the camera, transmitting a photographed image of the cooked food to a user terminal device, based on a first feedback related to the photographed image being received, providing a plurality of images for receiving selection of additional cooking states with respect to the food to the user terminal device, an based on a second feedback related to the photographed image being received, providing a plurality of menus for analyzing a cause of a cooking state of the food to the user terminal device.

The control method may, based on the first feedback being received, control driving of the cooking chamber to perform additional cooking according to one of the additional cooking states corresponding to the selected image based on one of the plurality of images provided to the user terminal device being selected.

The control method may, based on the second feedback being received, update information stored in the memory based on a selected menu among the plurality of menus provided to the user terminal device being selected.

The control method may control driving of the cooking chamber to stop based on third feedback for the photographed image being received.

The control method may include displaying the photographed image through the display provided in the cooking apparatus, displaying the photographed image, and controlling the display to, based on the first feedback being inputted through the input device, display the plurality of images for selecting additional cooking states for the food, and based on the second feedback being inputted through the input device, display the plurality of menus for analyzing the cause for the cooking state of the food.

The control method may further include, based on the first feedback being inputted, controlling driving of the cooking chamber to perform additional cooking according to one of the additional cooking states corresponding to the selected image based on one of the plurality of images displayed on the display being selected.

The control method may further include, based on the second feedback being received, updating information stored in the memory based on a menu among the plurality of menus displayed on the display being selected.

The control method may further acquire a three-dimensional image of the food using the camera and the laser device, based on the three-dimensional image of the food, identifying a food area and a non-food area from the photographed image of the food, and generating a plurality of images for receiving selection of additional cooking states with respect to the food by performing color correction on the food area of the photographed image.

The identifying the food area and the non-food area may include, based on an image, photographed by the camera, of a linear laser irradiated toward the food through the laser device, acquire three-dimensional spatial coordinates with respect to each of a plurality of areas on the photographed linear laser, and identifying an area in which a height value of the three-dimensional spatial coordinate is 0 among the plurality of areas as a non-food area, and identifying an area with a non-zero height value as a food area.

The identifying the food area and the non-food area may include acquiring a color value of food corresponding to each of a plurality of areas on the photographed linear laser based on the image photographed by the camera, and comparing with an area with a non-zero height value among areas in which the height value of the three-dimensional spatial coordinate is 0, and identifying an area where color value is within a predetermined range as a food area.

The identifying the food area and the non-food area may include matching the three-dimensional image of the food and the photographed image of the food and identifying an inside of an outer part area of the food identified from the photographed image as the food area.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
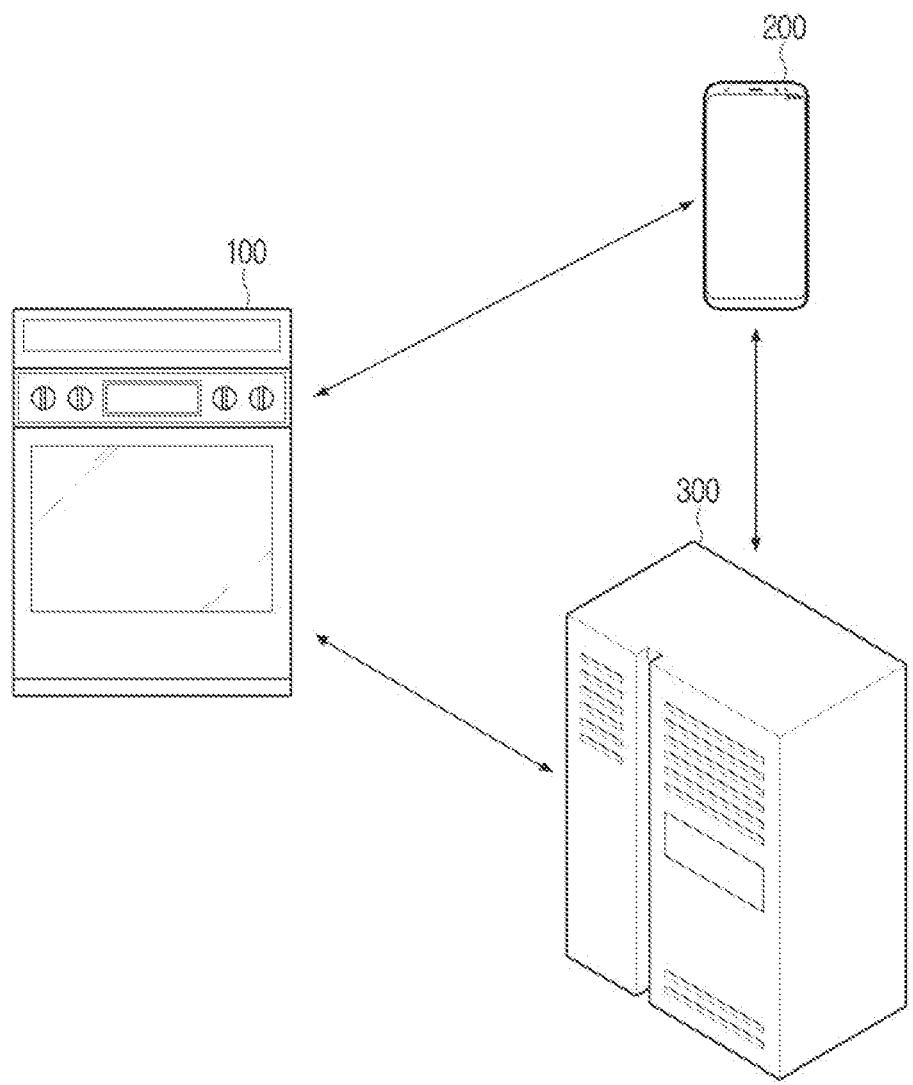
FIG. 1 is a view schematically illustrating a cooking system according to an embodiment.

In the following description, same drawing reference numerals are used for the same elements even in different drawings. In the following description, well-known functions or constructions may not be described in detail if they would obscure the invention in unnecessary detail. Further, dimensions of various elements in the accompanying drawings may be arbitrarily selected for assisting in a comprehensive understanding.

The terms used in the disclosure and the claims may be general terms selected in consideration of the functions of the various example embodiments of the disclosure. However, such terms may vary depending on an intention of those skilled in the art, a legal or technical interpretation, an emergence of a new technology, or the like. Also, there may be some terms arbitrarily selected by an applicant. Such terms may be construed according to meanings defined in the disclosure, and may also be construed based on general contents of the disclosure and a typical technical concept in the art unless the terms are not specifically defined.

In the description of the disclosure, the order of each step should be understood as non-limiting unless a preceding step is to be logically and temporally performed before a subsequent step. In other words, except for exceptional cases described above, even if the process described as a subsequent step is performed before the process described as the preceding step, an essence of the disclosure is not affected, and the scope of the disclosure should also be defined regardless of the order of the steps.

The terms "have", "may have", "include", and "may include" used in the exemplary embodiments of the present disclosure indicate the presence of corresponding features (for example, elements such as numerical values, functions, operations, or parts), and do not preclude the presence of additional features.

The terms such as "first," "second," and so on may be used to describe a variety of elements, but the elements should not be limited by these terms. The terms are only used to differentiate one component from other components. For example, the 'first' component may be named the 'second' component, and vice versa, without departing from the scope of the present disclosure.

In the disclosure, components necessary for the description of each embodiment of the disclosure are described, and thus the disclosure is not necessarily limited thereto. Accordingly, some components may be changed or omitted, and the other components may be added. In addition, they may be distributed and arranged in different independent devices.

Various example embodiments of the disclosure will be described in greater detail below with reference to the accompanying drawings and contents described in the accompanying drawings, but the disclosure is not restricted or limited by the embodiments.

The disclosure is to solve problem(s) in existing cooking apparatuses and control methods, and an object of the disclosure is to provide an image of food to a user and control a cooking apparatus through the user's feedback on the photographed image of the food or analysis of the photographed image, thereby providing the cooking apparatus capable of improving the user's cooking environment and a control method thereof.

Hereinafter, various example embodiments will now be explained in detail with reference to the accompanying drawings.

FIG. 1 is a view schematically illustrating a cooking system according to an embodiment.

Referring to FIG. 1, a cooking system may include a cooking apparatus 100, a user terminal device 200, and a server 300.

The cooking apparatus 100, the user terminal device 200, and the server 300 may control the other device through one device or share and update information with the other device by transmitting and receiving various types of information through communication.

The cooking apparatus 100 is an apparatus that performs various cooking operations by applying high-temperature heat generated using electricity or gas to food, and may correspond to an oven, an induction cooker, an electric range, a gas range, or the like.

The user terminal device 200 is a device capable of performing various functions, such as providing information to a user or receiving a user command, and may be various electronic devices such as a smartphone, a tablet, a wearable device, a PC, or the like.

The server 300 may refer to an electronic device that collects and processes data of an external device. For example, the server 300 is not only a device that performs a function dedicated to a server, such as a cloud server, but also the sever may be implemented as various electronic devices such as a smartphone, tablet, wearable device, PC, or the like that can perform the function of the server together with other functions. However, this is only an example, and the server 300 may also be implemented with various types of electronic devices not listed therein. Also, the server 300 may be implemented as a single device or as an aggregate comprising a plurality of devices. For example, the server 300 may be a server that provides a SmartThings service.

With respect to the cooking system according to an embodiment of the disclosure, the cooking apparatus 100 may include a camera for photographing food to be cooked, and transmit information including an image photographed through a camera to the user terminal device 200. In that configuration, the cooking apparatus 100 may transmit information directly to the user terminal device 200 or transmit it through the server 300.

The user terminal device 200 may provide the received photographed image to the user through a display, and may receive a user input with respect to the photographed image. The user terminal device 200 may transmit feedback according to the user input to the cooking apparatus 100. In that configuration, the user terminal device 200 may transmit information directly to the cooking apparatus 100 or may transmit the information through the server 300.

The cooking apparatus 100 may control various components of the cooking apparatus 100 based on the feedback received from the user terminal device 200. As an example, the cooking apparatus 100 may receive feedback requesting additional cooking with respect to a photographed image of food, a feedback indicating a cooking failure, a feedback indicating a cooking success, or the like, control a cooking chamber to perform additional cooking on food according to each feedback, or generate a notification message to be provided to the user when the same cooking is performed thereafter.

Accordingly, it may control the cooking apparatus 100 by providing information on the cooking apparatus 100 through the user terminal device 200 such as a mobile device familiar to the user and receiving a user command therefor, thereby improving user accessibility and convenience on the cooking environment.

Detailed descriptions related to the respective operations of the cooking apparatus 100 and the user terminal device 200 will be described below with reference to the accompanying drawings.

Figure 2:
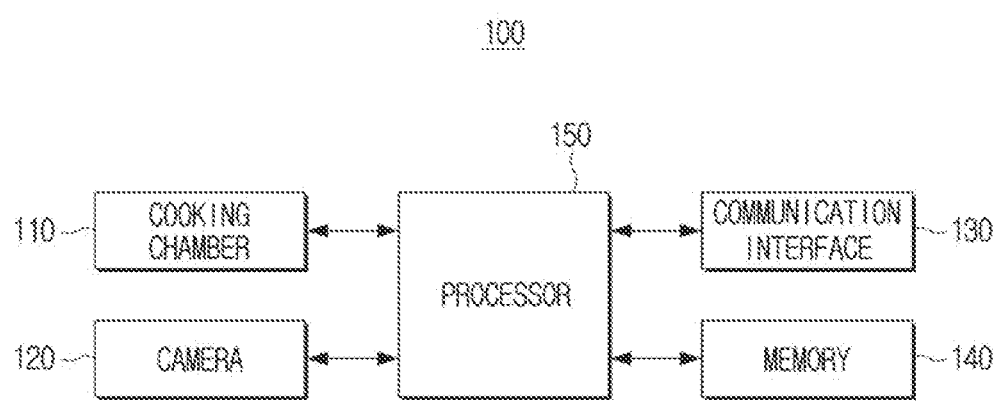
FIG. 2 is a block diagram illustrating a configuration of a cooking apparatus according to an embodiment.

FIG. 2 is a block diagram illustrating a configuration of a cooking apparatus according to an embodiment.

Referring to FIG. 2, the cooking apparatus 100 includes a cooking chamber 110, a camera 120, a communication interface 130, and a memory 140.

The cooking chamber 110 may include a space for accommodating food and is configured to perform a cooking operation on the food. The cooking chamber 110 may include a heating member for generating heat, a driving device capable of rotating and moving food, or the like.

The camera 120 may be provided inside the cooking chamber 110, and may photograph inside of the cooking chamber 110. Particularly, the camera 120 may photograph food accommodated in the cooking chamber 110.

The communication interface 130 may transmit/receive various information by performing communication with an external device. The cooking apparatus 100 may communicate with various external devices such as the user terminal device 200 and the server 300 through the communication interface 130.

The communication interface 130 may communicate with an external device through a local area network (LAN), an Internet network, and a mobile communication network, and may also communicate with an external device through various communication methods such as Bluetooth (BT), Bluetooth Low Energy (BLE), Wireless fidelity Direct (WI-FI Direct), Zigbee, NFC, or the like. For this operation, the communication interface 130 may include various communication modules for performing network communication. For example, the communication interface 130 may include a Bluetooth chip, a Wi-Fi chip, a wireless communication chip, or the like.

Various instructions, programs, or data required for the operation of the cooking apparatus 100 or the processor 150 may be stored in the memory 140.

Information on various food that can be cooked by the cooking apparatus 100 may be stored in the memory 140, and information on a cooking method for each food may be stored. For example, the cooking method stored in the memory 140 may include information such as a cooking time, a cooking temperature, a cooking pattern, or the like.

The processor 150 may be electrically connected to the cooking chamber 110, the camera 120, the communication interface 130, and the memory 140 to control the overall operation of the cooking apparatus 100.

When food is selected in the user terminal device 200 connected through the communication interface 130, the processor 150 may drive the cooking chamber 110 based on a cooking method corresponding to the selected food. Information on a cooking method corresponding to each food may be acquired from the memory 140. The processor 150 may not only receive a cooking selection command through the user terminal device 200, but also receive a cooking selection command through input device (or input interface 160) such as an operation panel provided in the cooking apparatus 100.

The processor 150 may control the camera 120 to photograph food inside the cooking chamber. The processor 150 may control the camera 120 to photograph the food when the cooking of the food is completed, that is, when a cooking operation according to the cooking method corresponding to the selected food is completed.

The processor 150 may control the communication interface 130 to transmit the photographed image of the food acquired through the camera 120 to the user terminal device 200. For example, the processor 150 may transmit the photographed image of cooked food to the user terminal device 200. Accordingly, the user terminal device 200 may provide the received photographed image to the user through a display. Meanwhile, the processor 150 may control to display the photographed image through the display 171 provided in the cooking apparatus 100.

Figure 3:
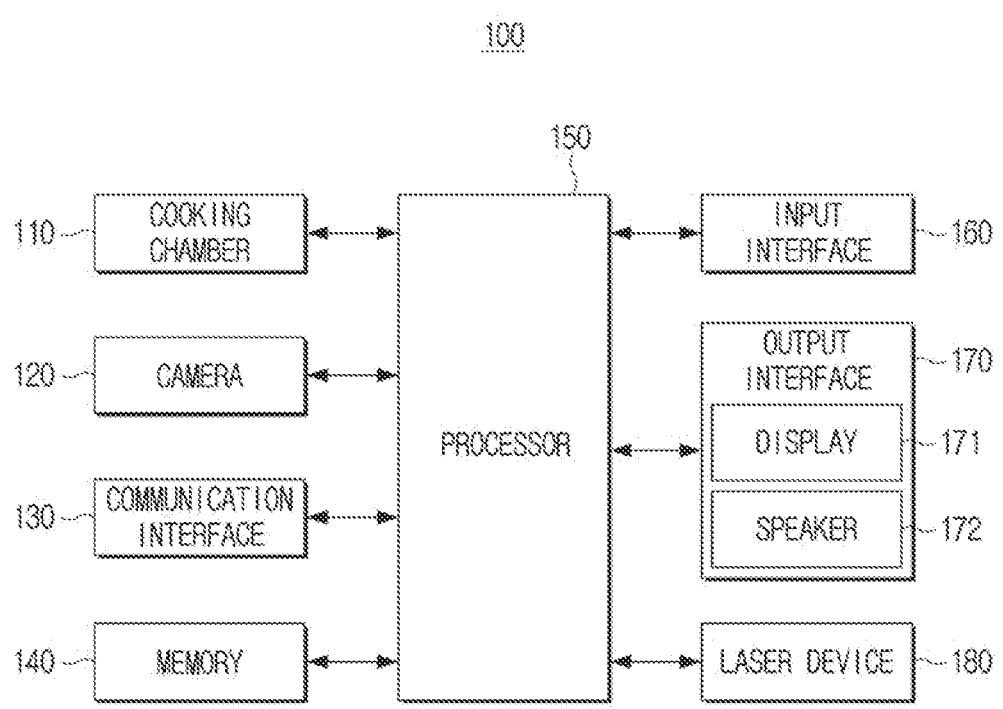
FIG. 3 is a block diagram illustrating a detailed configuration of a cooking apparatus according to an embodiment.

FIG. 3 is a block diagram illustrating a detailed configuration of a cooking apparatus according to an embodiment.

Referring to FIG. 3, the cooking apparatus 100 may include a cooking chamber 110, a camera 120, a communication interface 130, a memory 140, an input interface 160, an output interface 170, and a laser device 180. Detailed descriptions of constitutional elements illustrated in FIG. 3 that are redundant with constitutional elements in FIG. 2 are omitted.

The input interface 160 may receive various user commands. For example, the input interface 160 may receive a user command for controlling the cooking apparatus 100 to perform an executable cooking operation. In addition, the input interface 160 may receive a user's feedback on the photographed image of the food.

The input interface 160 may be implemented as an operation panel that receives a user command through a button (or key) of the cooking apparatus 100, a display that receives a user command through a touch screen, a microphone that receives a user's uttered voice, or the like. The input interface 160 may be expressed as an input device.

The output interface 170 may include at least one of a display 171 and a speaker 172. The display 171 is a device for outputting information in a visual form (e.g., text, image, etc.). The display 171 may display an image frame on all or part of a display area. The display area may refer to an entire area of a pixel unit in which information or data is visually displayed. The speaker 172 is a device that outputs information in an auditory form (e.g., voice). The speaker may directly output not only various notification sounds or voice messages but also various audio data on which various processing tasks such as decoding, amplification, and noise filtering have been performed by an audio processing unit, as sound.

The laser device 180 may be provided inside the cooking chamber 110, and may irradiate a laser toward the food disposed inside the cooking chamber 110. The processor 150 may acquire a 3D image of the food using the camera 120 and the laser device 180. For example, the processor 150 may acquire a three-dimensional image of the food based on an image photographed by the camera 120 with a linear laser irradiated toward the food through the laser device 180.

The processor 150 may identify the photographed image of the food into a food area and non-food area using the three-dimensional image of the food.

An embodiment of the disclosure for acquiring a three-dimensional image of food using the laser device 180 will be described below with reference to FIGS. 16 to 18.

Figure 4:
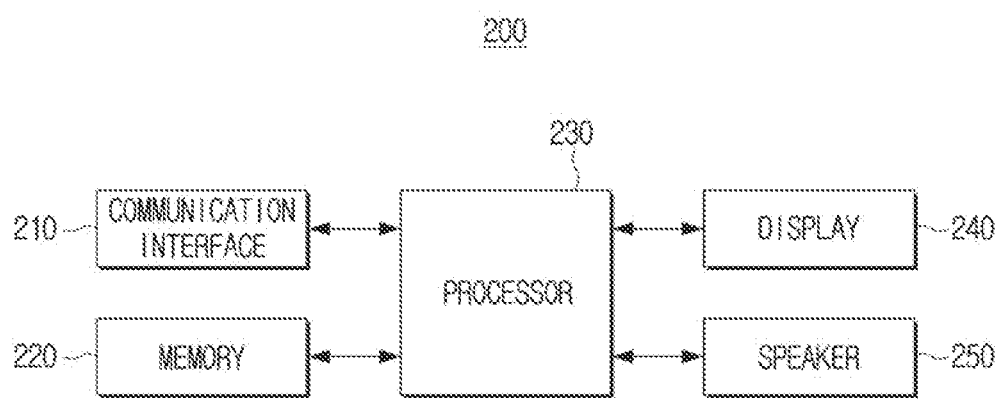
FIG. 4 is a block diagram illustrating a configuration of a user terminal device according to an embodiment.

FIG. 4 is a block diagram illustrating a configuration of a user terminal device according to an embodiment.

Referring to FIG. 4, the user terminal device 200 may include a communication interface 210, a memory 220, a processor 230, a display 240, and a speaker 250.

The communication interface 210 may transmit/receive various information by communicating with an external device such as the cooking apparatus 100 and the server 300. The communication interface 210 may transmit a signal for controlling the cooking apparatus 100, such as a cooking selection command, a feedback command, or the like and receive various cooking information including a photographed image of the food from the cooking apparatus 100.

An application for controlling the cooking apparatus 100 including a camera for photographing the inside of the cooking chamber may be stored in the memory 220. The user terminal device 200 may transmit/receive information to and from the cooking apparatus 100 or the server 300 by executing an application stored in the memory 220. For example, the user terminal device 200 may transmit a user command input through an application execution screen to the cooking apparatus 100 through the server 300.

When an application is first executed, a plurality of reference images representing different cooking levels are provided to the user through the display 240, and when one of the plurality of reference images is selected, the processor may store the user's cooking preference according to the selected reference image. Accordingly, the processor 230 may update a cooking method according to the user's cooking preference and control the cooking chamber to be driven based on the updated cooking method. A detailed description related thereto will be described below with reference to FIG. 5.

In addition, when the application is executed, the processor 230 may control the display 240 to display food selection UI for receiving an input of food to be cooked in the cooking apparatus 100, and control the communication interface 210 to transmit a control signal corresponding to food input in the food selection UI to the cooking apparatus 100. A detailed description thereof will be described below with reference to FIG. 6.

In addition, when the processor 230 receives the photographed image of food from the cooking apparatus 100, the processor 230 may control the display 240 to display a plurality of menus for receiving an input for the photographed image and a cooking state of the food, and when one of the plurality of menus is selected, the processor 230 may transmit feedback corresponding to the selected menu to the cooking apparatus 100. In that configuration, the plurality of menus may include a first menu for requesting additional cooking of the food, a second menu for notifying a cooking failure of the food, and a third menu for notifying a success of cooking of the food. A detailed description related thereto will be described below with reference to FIG. 7.

Figure 5:
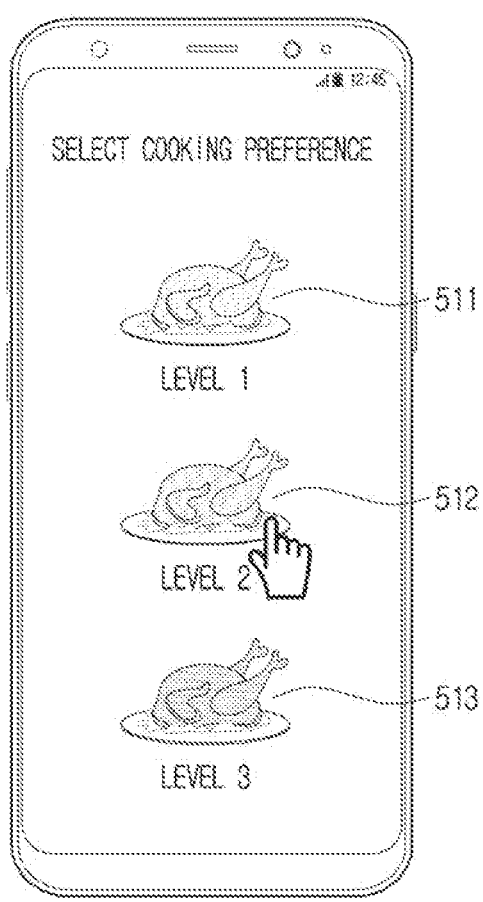
FIG. 5 is a view illustrating that a UI for displaying a plurality of reference images indicating different cooking levels is provided through a user terminal device according to an embodiment.

FIG. 5 is a view illustrating that a UI for displaying a plurality of reference images indicating different cooking levels is provided through a user terminal device according to an embodiment.

The user terminal device 200 may display a plurality of reference images 511, 512, and 513 indicating different cooking levels. As an example, the plurality of reference images 511, 512, and 513, indicating different cooking levels, may be images to which different roasting steps (or degrees of roasting) are applied to the same food. The user may select a reference image suitable for his/her preference from among the plurality of reference images 511, 512, and 513.

When one of the plurality of reference images is selected, the user terminal device 200 may store the user's cooking preference according to the selected reference image. Accordingly, the processor 230 may update a cooking method according to the user's cooking preference and control the cooking chamber to be driven based on the updated cooking method.

For example, the user terminal device 200 may transmit a control signal corresponding to the selected reference image to the cooking apparatus 100. The cooking apparatus 100 may control the cooking chamber to perform a cooking operation corresponding to the selected reference image, that is, a cooking operation for achieving the selected degree of roasting.

Also, the cooking apparatus 100 may update a cooking method stored in the memory according to the cooking level corresponding to the selected reference image. In that configuration, the cooking method for each of the plurality of food stored in the memory of the cooking apparatus 100 may be updated according to the selected cooking level. For example, when the reference image 512 corresponding to a second cooking level is selected, the cooking method for each of a plurality of stored food may be set as the second cooking level.

The plurality of reference images and the cooking method corresponding to each of the plurality of reference images may be stored in the memory of the user terminal device 200 or the cooking apparatus 100.

Figure 6:
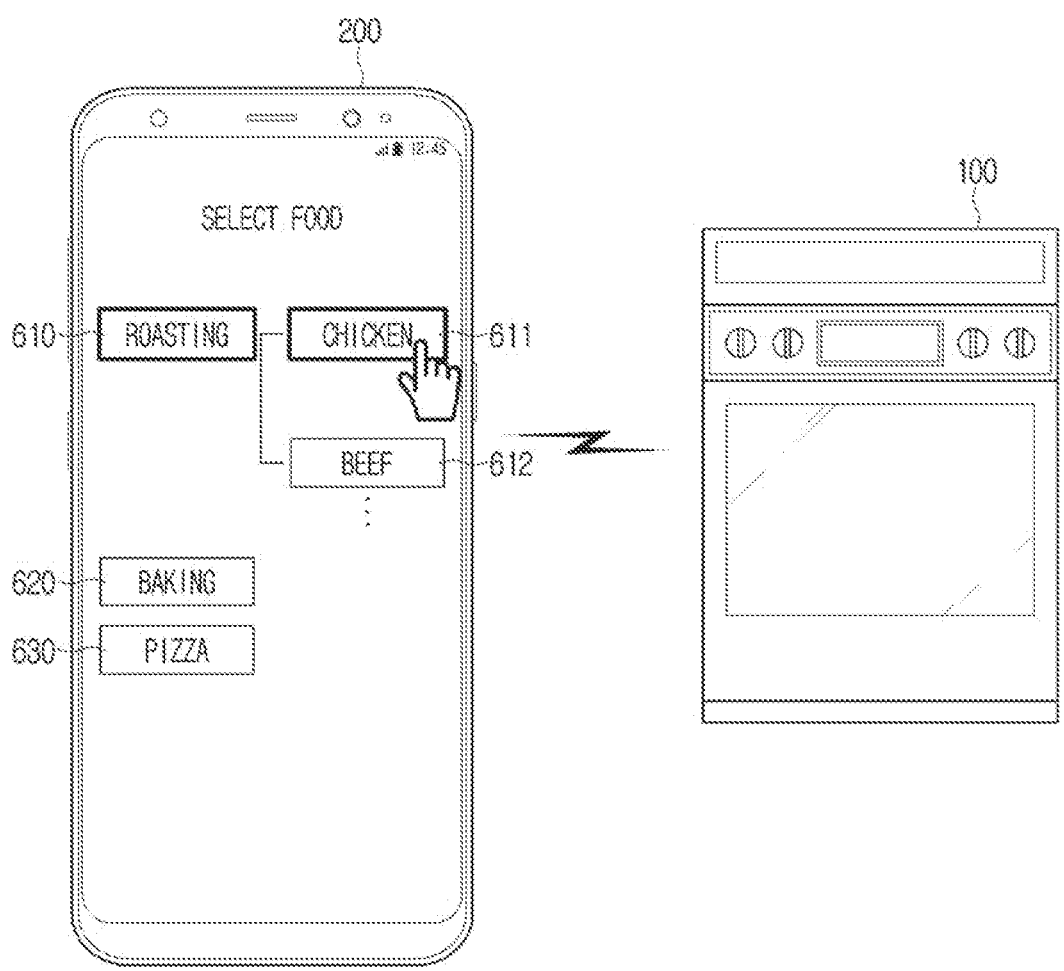
FIG. 6 is a view illustrating that a food selection UI is provided and a signal for driving a cooking chamber according to a selected food is transmitted to a cooking apparatus through the user terminal device according to an embodiment.

FIG. 6 is a view illustrating that a food selection UI is provided and a signal for driving a cooking chamber according to a selected food is transmitted to a cooking apparatus through the user terminal device according to an embodiment;

The user terminal device 200 may display a UI for receiving a selection of food to be cooked through the cooking apparatus 100. The food selection UI may be provided through an execution screen of an application stored in the user terminal device 200. Referring to FIG. 6, various cooking recipes 610, 611, 612, 620, and 630 that can be cooked by the cooking apparatus 100 may be displayed.

When food is selected through the food selection UI, the user terminal device 200 may transmit a control signal for driving the cooking chamber to the cooking apparatus 100 based on a cooking method corresponding to the selected food.

Figure 7:
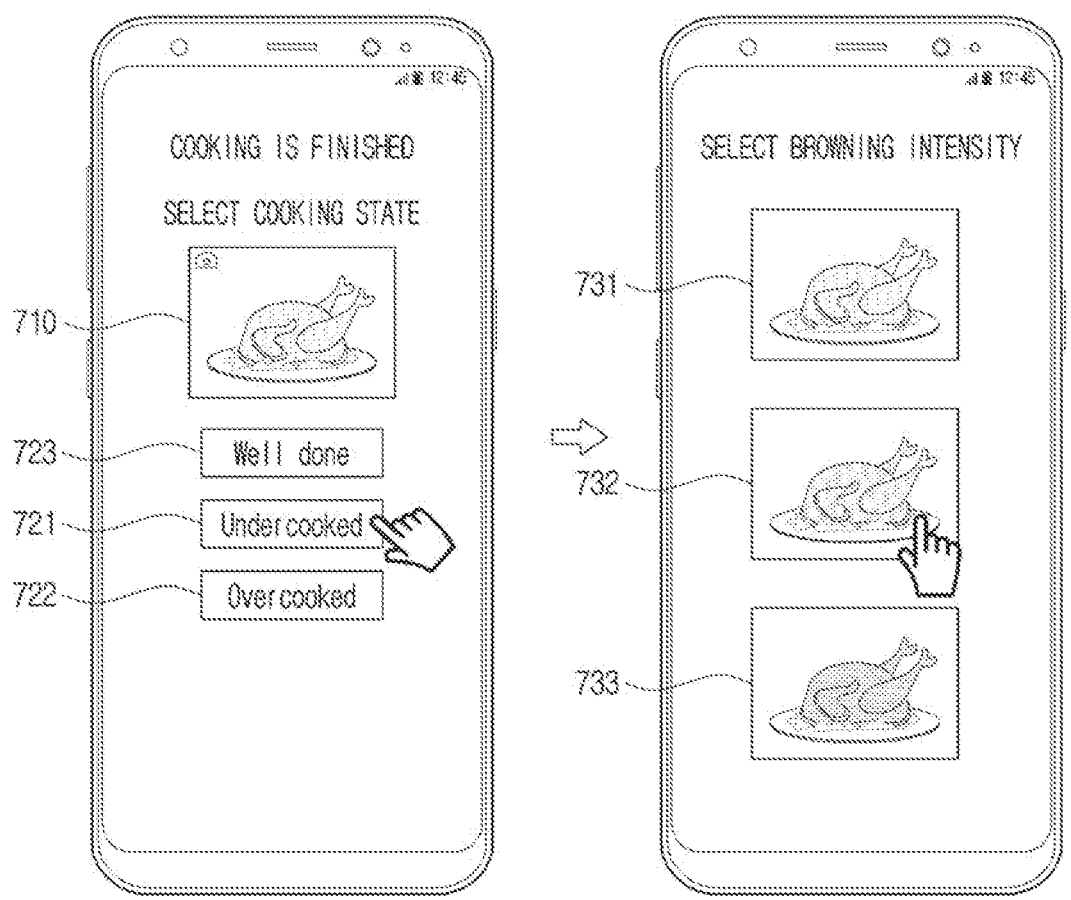
FIG. 7 is a view illustrating that a UI for displaying a photographed image of cooked food and a plurality of menus received from a user regarding a cooking state of the food is provided, and a UI for displaying a plurality of images for selecting an additional cooking condition when a first menu for requesting additional cooking of food is selected is provided.

FIG. 7 is a view illustrating that a UI for displaying a photographed image of cooked food and a plurality of menus received from a user regarding a cooking state of the food is provided, and a UI for displaying a plurality of images for selecting an additional cooking condition when a first menu for requesting additional cooking of food is selected is provided.

Referring to FIG. 7, after the cooking apparatus 100 completes cooking, the user terminal device 200 may display a plurality of menus 721, 722 and 723 for receiving a photographed image 710 of photographed food and a cooking state of the food. The plurality of menus may include a first menu 721 for requesting additional cooking of the food, a second menu 722 for notifying a cooking failure of the food, and a third menu 723 for notifying a cooking success of the food.

The user may identify whether the food is undercooked, overcooked, or well done by looking at the photographed image 710. The user may select any one of the plurality of menus 721, 722, and 723 according to the identification of a cooking state of the photographed image 710.

For example, when it is identified that the food is in a undercooked, the user may select the first menu 721 for requesting additional cooking of the food. In addition, when it is identified that the food is overcooked, the user may select the second menu 722 for notifying the cooking failure, and if it is identified that the food is properly cooked, the user may select the third menu 723 for notifying the cooking success.

When the first menu 721 is selected, the user terminal device 200 may transmit first feedback on the photographed image to the cooking apparatus 100. When the first feedback is received, the cooking apparatus 100 may provide a plurality of images 731, 732, and 733 for selecting additional cooking states for food to the user terminal device 200, and when one of the plurality of images is selected, the cooking apparatus 100 may control a driving of the cooking chamber 110 to perform additional cooking according to additional cooking states corresponding to the selected image.

When the first feedback is received from the user terminal device 200, the cooking apparatus 100 may provide the user terminal device 200 with the plurality of images 731, 732, and 733 for selecting additional cooking states for food. When the cooking apparatus 100 receives a selection command for selecting one of the plurality of images 731, 732, and 733 from the user terminal device 200, the cooking apparatus 100 may control to perform additional cooking according to additional cooking states corresponding to the selected image.

In that configuration, the plurality of images 731, 732, and 733 may correspond to an image that is generated by correcting a photographed image (a photographed image of food identified to be undercooked, such as 710) photographed by the camera 120 of the cooking apparatus 100. In other words, in the case of the roasting food as shown in FIG. 7, an image of the food according to a result expected when additional cooking is performed may be provided to the user step by step by displaying a degree of browning according to additional cooking through color correction of the photographed image of the food. Accordingly, the user may intuitively identify a desired degree of additional cooking, and may transmit a control command to perform additional cooking corresponding to the selected image to the cooking apparatus 100.

An operation of generating an image of an expected result according to additional cooking by using the photographed image of the food may be performed by the cooking apparatus 100, the user terminal device 200, or the server 300. In that configuration, an expected result image may be generated by applying a style transfer method of synthesizing a style of the other image (e.g., a reference image of food to which a stronger degree of roasting is applied) to the photographed image.

When the second menu 722 is selected, the user terminal device 200 may transmit second feedback on the photographed image to the cooking apparatus 100. When the second feedback is received, the cooking apparatus 100 may provide a plurality of menus for analyzing a cause of a cooking state of the food to the user terminal device 200, and when at least one of the plurality of menus is selected, the cooking apparatus 100 may update information stored in the memory 140 based on the selected menu.

Meanwhile, the user terminal device 200 may display a failure analysis UI for receiving a cooking failure factor as an input. A detailed description related thereto will be described below with reference to FIG. 9.

Meanwhile, when a third menu 623 is selected, the user terminal device 200 may transmit third feedback for controlling to stop driving of the cooking chamber of the cooking apparatus 100 such that a cooking operation of the cooking apparatus 100 is terminated.

Meanwhile, according to the other embodiment of the disclosure, the cooking apparatus 100 may identify a cooking state by comparing the photographed image of the food and a pre-stored image of cooked food without a user's feedback input. In that configuration, the cooking apparatus 100 may identify whether additional cooking is required, whether cooking is unsuccessful, or weather cooking is successful, based on the result of comparison between the photographed image and the image of cooked food, thereby performing an operation corresponding to each of the cooking state.

Figure 8:
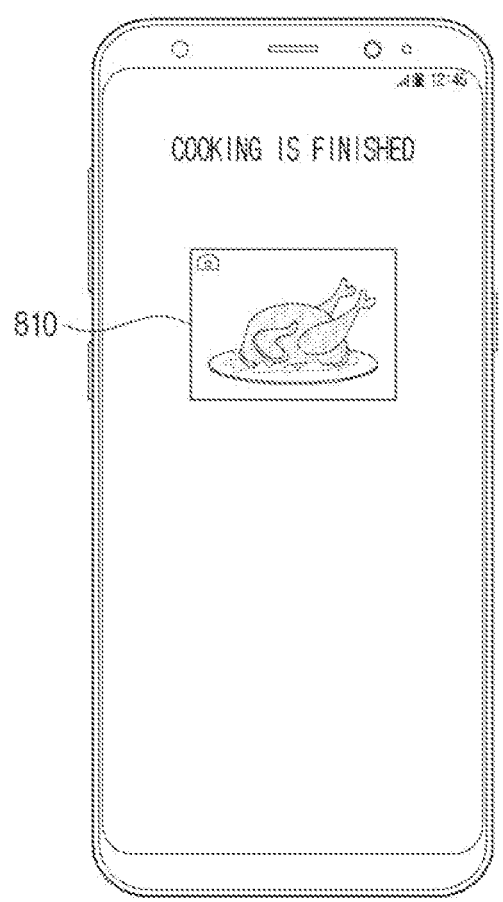
FIG. 8 is a view illustrating a UI for displaying an image of cooked food after cooking corresponding to the image selected in FIG. 7 is performed.

FIG. 8 is a view illustrating a UI for displaying an image of cooked food after cooking corresponding to the image selected in FIG. 7 is performed.

After the additional cooking is completed, the cooking apparatus 100 may provide a photographed image 810 acquired by photographing the food to the user terminal device 200.

Meanwhile, a UI for displaying a plurality of menus for receiving an input with respect to a photographed image of food and a cooking state of food may be provided through the display 171 provided in the cooking apparatus 100 as well as the user terminal device 200. A detailed description related thereto will be described below with reference to FIGS. 11 to 14.

Figure 9:
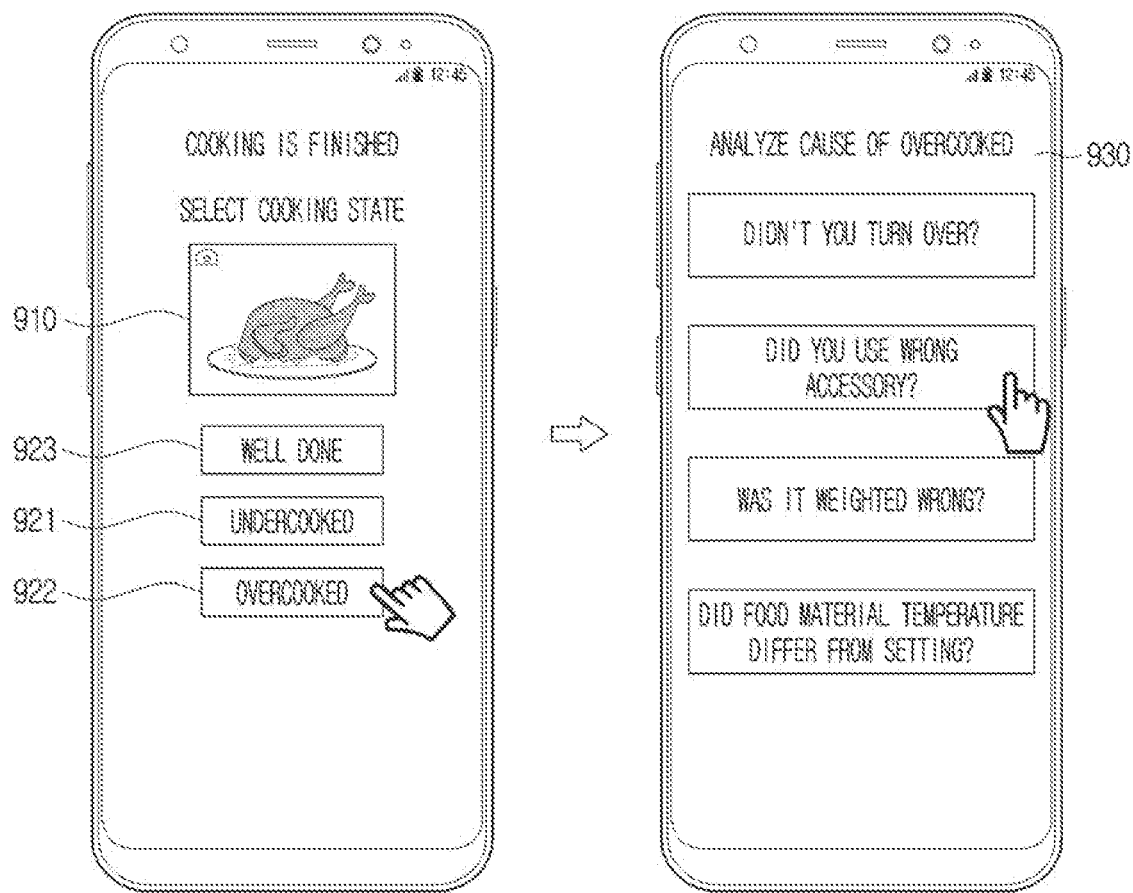
FIG. 9 is a view illustrating that a UI for displaying a plurality of menus for analyzing a cause relative to a cooking state of food is provided when a second menu for notifying a cooking failure of food is selected.

FIG. 9 is a view illustrating that a UI for displaying a plurality of menus for analyzing a cause relative to a cooking state of food is provided when a second menu for notifying a cooking failure of food is selected.

Referring to FIG. 9, after the cooking apparatus 100 completes cooking, the user terminal device 200 may display a plurality of menus 921, 922 and 923 for receiving a photographed image 910 of photographed food and a cooking state of the food.

When a second menu 922 for notifying a cooking failure of the food is selected, the user terminal device 200 may provide a plurality of menus 930 for analyzing a cause of a cooking state of the food, and when at least one of the plurality of menus is selected, the user terminal device 200 may update information stored in the memory 140 of the cooking apparatus 100 based on the selected menu. In that configuration, the update may include an update for correcting at least one of a cooking time, a cooking temperature, and a cooking pattern included in the cooking method, or an update for generating a notification message to be provided for the next cooking.

The user terminal device 200 may provide a menu 930 from which various cooking failure factors can be selected, receive the cooking failure factors from the user and store them in the memory 140, thereby providing a notification message about cooking failure history to the user when the same cooking is performed next time.

Figure 10:
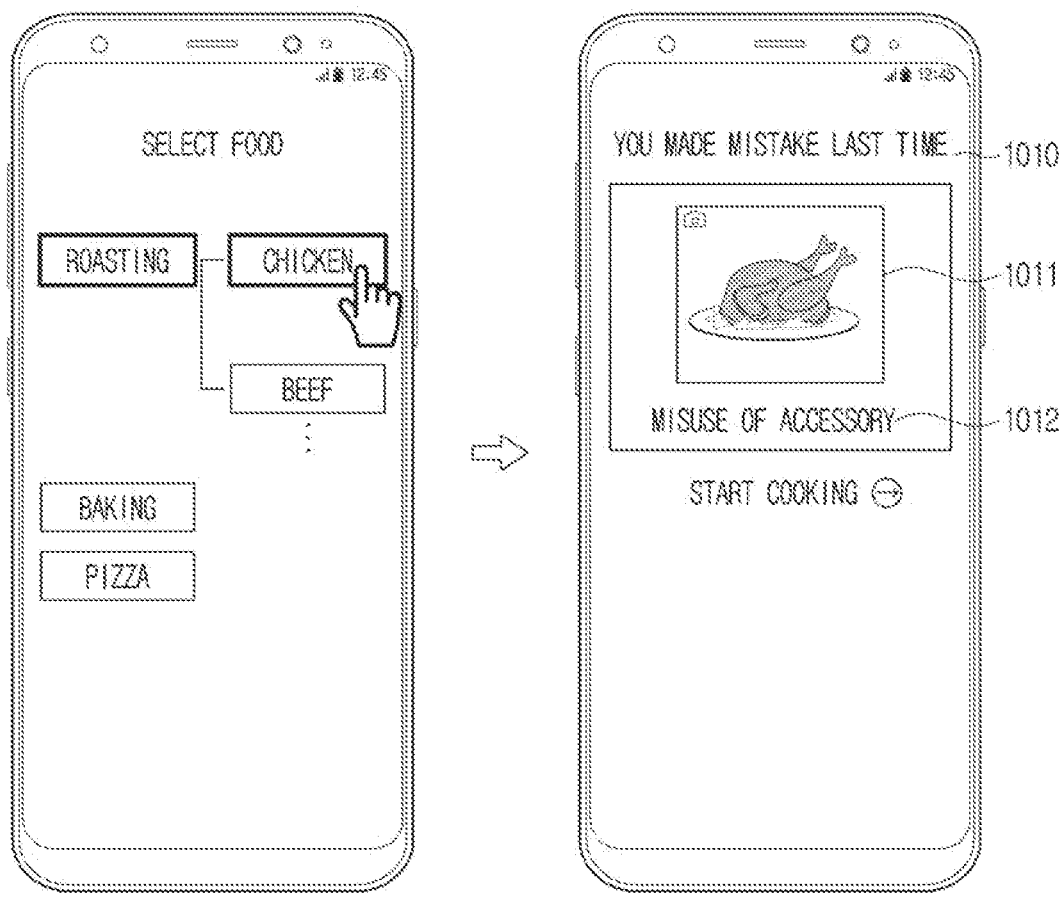
FIG. 10 is a view illustrating a UI for displaying a notification message when food having a cooking failure history is selected.

FIG. 10 is a view illustrating a UI 1010 for displaying a notification message when food having a cooking failure history is selected.

Referring to FIG. 10, when there is a cooking failure history with respect to the food selected by the user, a photographed image 1011 (cooking failure image) of the food photographed in a previous cooking before performing a cooking operation and a cooking failure factor 1012 selected by the user may be provided.

Figure 11:
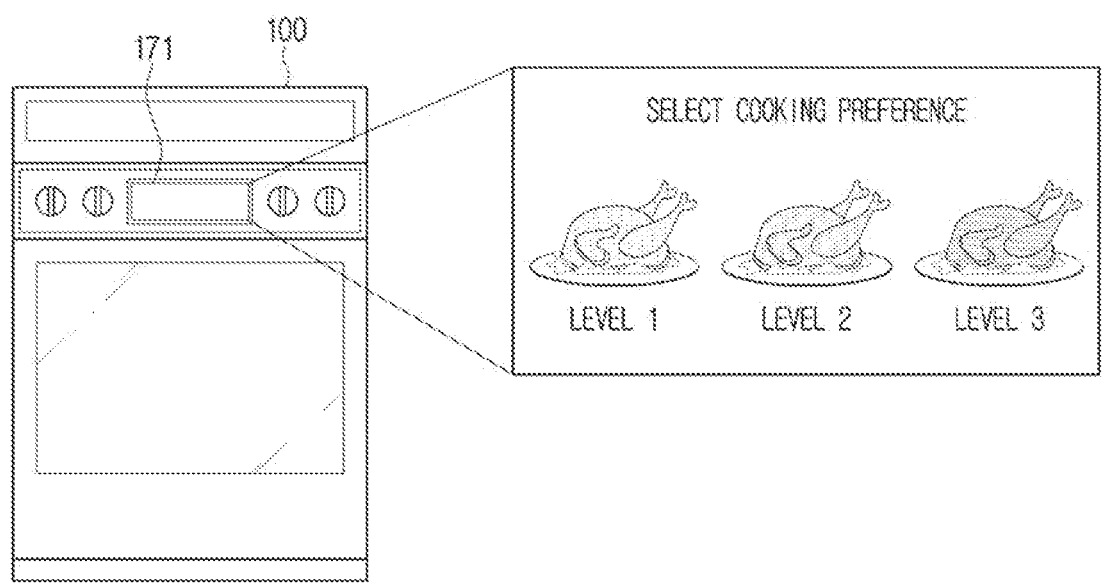
FIG. 11 is a view illustrating that a UI for displaying a plurality of reference images indicating different cooking levels is provided through a display provided in a cooking apparatus according to an embodiment.
Figure 12:
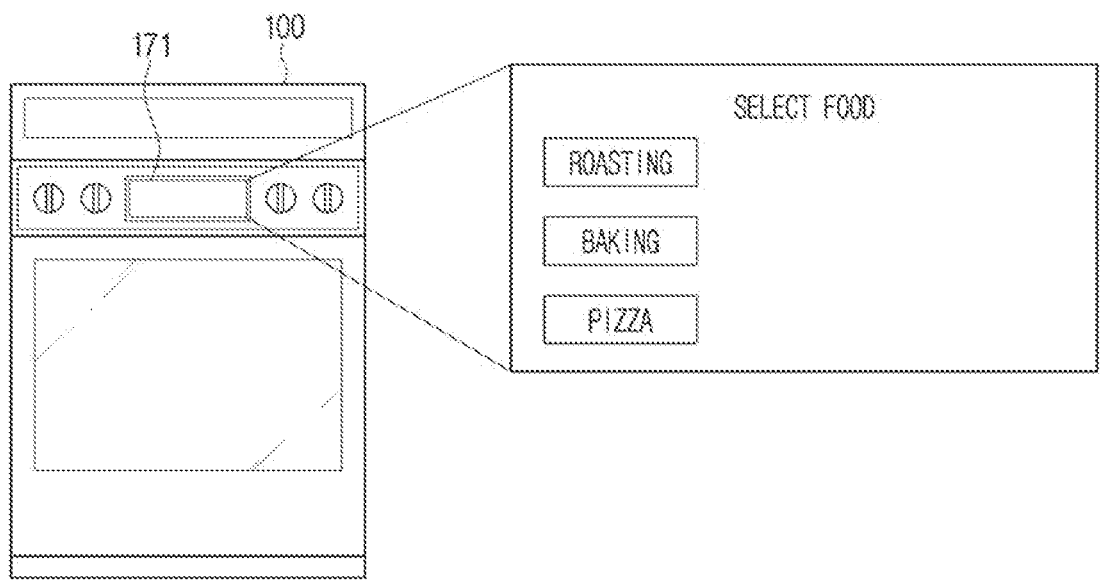
FIG. 12 is a view illustrating that a food selection UI is provided through a display provided in a cooking apparatus.

FIG. 11 is a view illustrating that a UI for displaying a plurality of reference images indicating different cooking levels is provided through a display provided in a cooking apparatus according to an embodiment, and FIG. 12 is a view illustrating that a food selection UI is provided through a display provided in a cooking apparatus.

With respect to the UI displayed through the display 171 of the cooking apparatus 100, since the descriptions of the UI of the user terminal device 200 described above with reference to FIGS. 6 to 8 may be equally applied, the overlapping description will be omitted.

Figure 13:
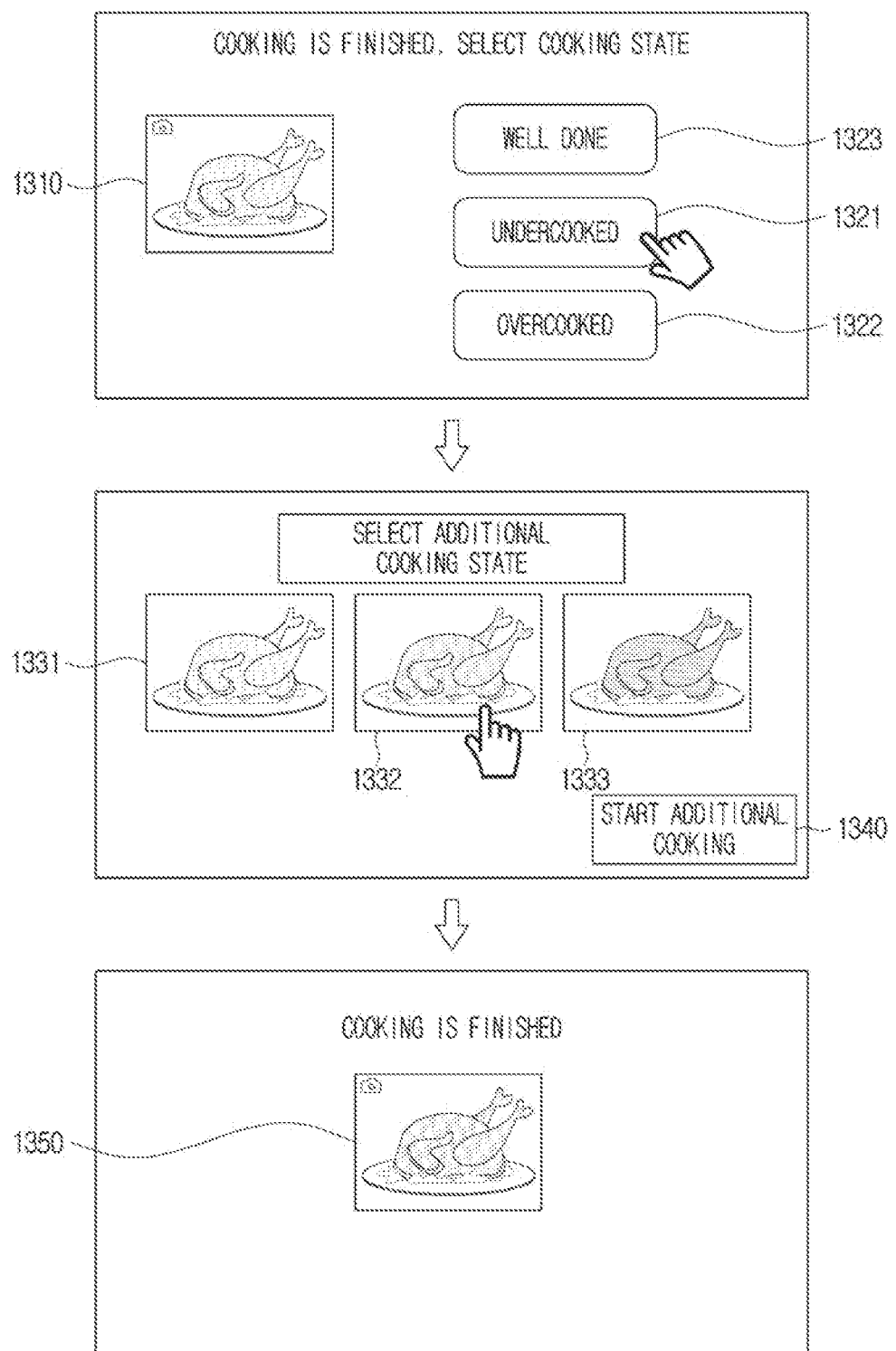
FIG. 13 is a view illustrating that a UI for displaying a photographed image of cooked food and a plurality of menus received from a user regarding a cooking state of the food is provided, and a UI for displaying a plurality of images for selecting an additional cooking condition when a first menu for requesting additional cooking of food is selected is provided, through a display provided in a cooking apparatus.

FIG. 13 is a view illustrating that a UI for displaying a photographed image of cooked food and a plurality of menus received from a user regarding a cooking state of the food is provided, and a UI for displaying a plurality of images for selecting an additional cooking condition when a first menu for requesting additional cooking of food is selected is provided, through a display provided in a cooking apparatus.

Referring to FIG. 13, the cooking apparatus 100 may display a photographed image 1310 of cooked food and a plurality of menus 1321, 1322, and 1323 for receiving input regarding a cooking state of the food through the display 171. The plurality of menus may include a first menu 1321 for requesting additional cooking of the food, a second menu 1322 for notifying a cooking failure of the food, and a third menu 1323 for notifying a cooking success of the food.

In that configuration, the cooking apparatus 100 may receive a user command through an input device (or the input interface 160) such as an operation panel provided in the cooking apparatus 100. Meanwhile, when the display 171 is implemented as a touch screen, a user command may be input through a touch input on the display 171.

When a selection for the first menu 1321 is input, the cooking apparatus 100 may display a plurality of images 1331, 1332, and 1333 for selecting additional cooking states for food through the display 171. When one of the plurality of images is selected and an additional cooking start command is input through an additional cooking start UI 1340, the cooking apparatus 100 may control driving of the cooking chamber 110 to perform additional cooking according to additional cooking states corresponding to the selected image.

Also, when additional cooking is completed, the cooking apparatus 100 may display a photographed image 1350 of photographed food through the display 171.

Figure 14:
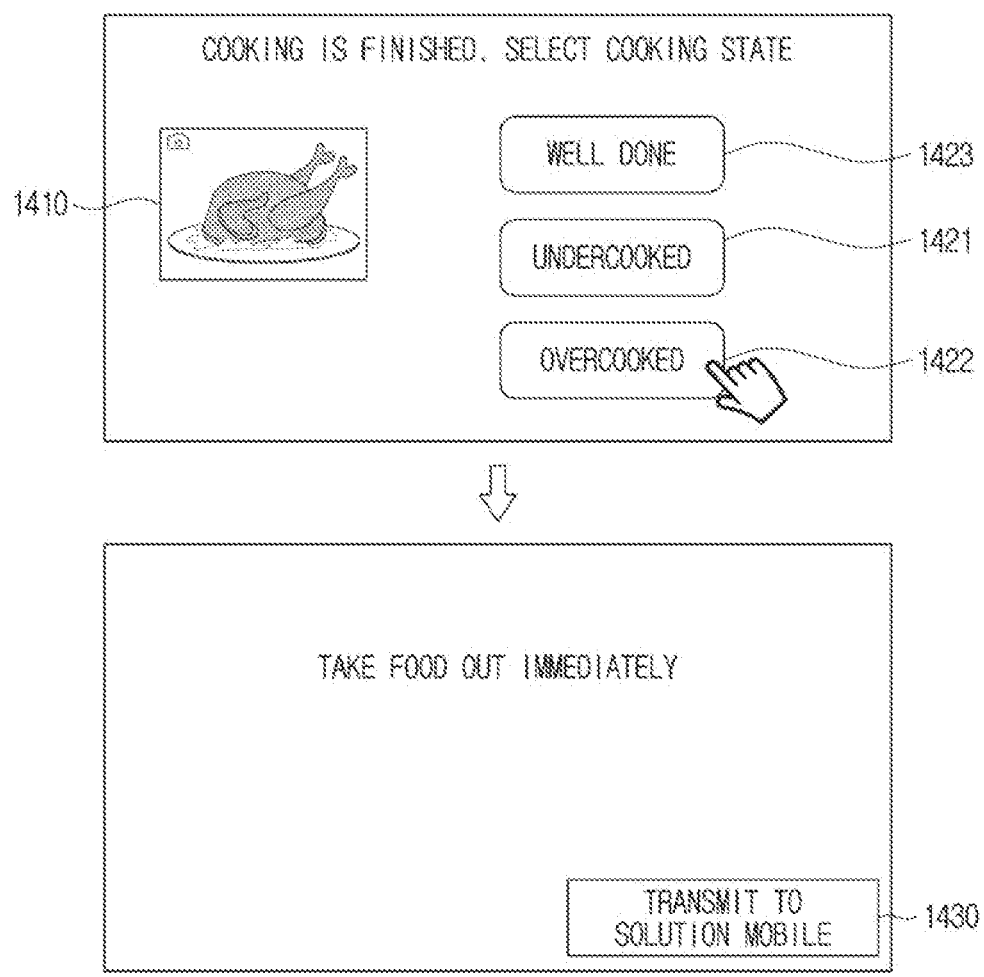
FIG. 14 is a view illustrating that a UI for transmitting information to a user terminal device to analyze a cause relative to a cooking state of food is provided when a second menu for notifying a cooking failure of food is selected.

FIG. 14 is a view illustrating that a UI for transmitting information to a user terminal device to analyze a cause relative to a cooking state of food is provided when a second menu for notifying a cooking failure of food is selected.

Referring to FIG. 14, the cooking apparatus 100 may display a photographed image 1410 of food photographed after cooking is completed and a plurality of menus 1421, 1422, and 1423 for receiving an input regarding a cooking state of the food.

The cooking apparatus 100 may display a UI 1430 that transmits information to the user terminal device to analyze a cause of a cooking state of the food when a selection with respect to the second menu 922 for notifying a cooking failure of the food is input. In that configuration, when information is transmitted from the cooking apparatus 100 to the user terminal apparatus 200, the user terminal apparatus 200 may provide a failure analysis UI (refer to 930 of FIG. 9) to the user.

Figure 15:
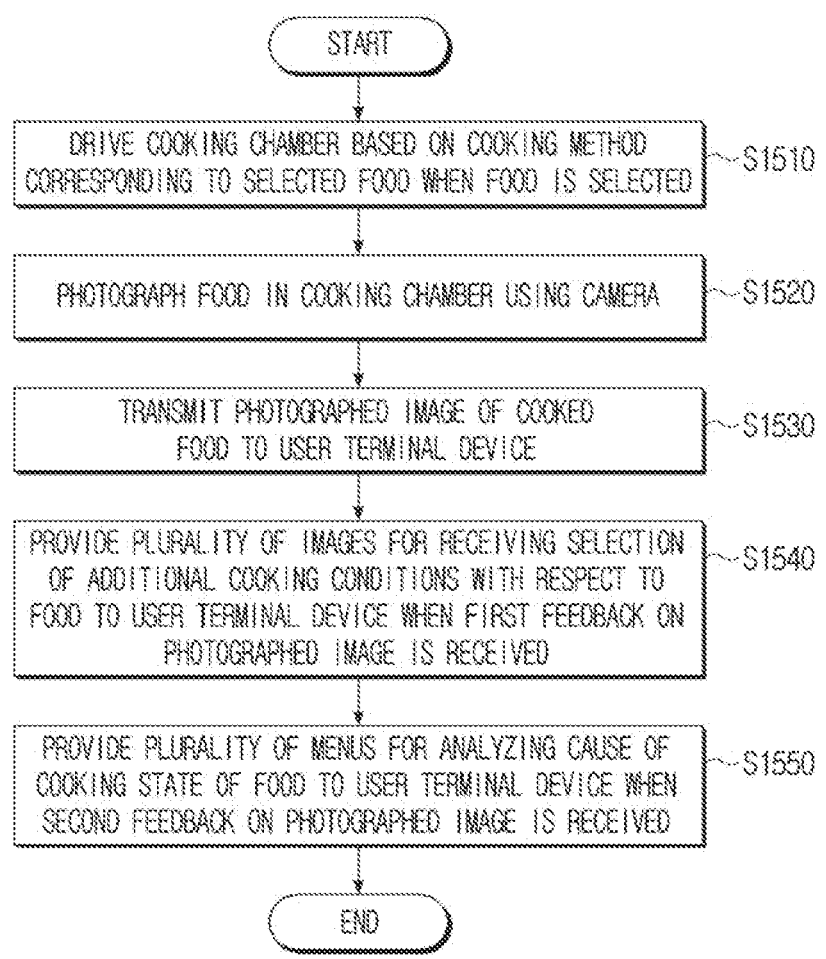
FIG. 15 is a flowchart illustrating a method of controlling a cooking apparatus according to an embodiment of the disclosure.

FIG. 15 is a flowchart illustrating a method of controlling a cooking apparatus according to an embodiment of the disclosure.

Referring to FIG. 15, a control method of the cooking apparatus according to an embodiment of the disclosure may include driving the cooking chamber based on a cooking method corresponding to a selected food when food is selected (S1510), photographing food in a cooking chamber using a camera (S1520), transmitting a photographed image of the cooked food to a user terminal device (S1530), providing a plurality of images for receiving selection of additional cooking states with respect to the food to the user terminal device when first feedback on the photographed image is received (S1540), and providing a plurality of menus for analyzing a cause of a cooking state of the food to the user terminal device when second feedback for the photographed image is received (S1550).

When food is selected, the cooking apparatus may drive the cooking chamber based on a cooking method corresponding to the selected food (S1510).

The cooking apparatus may photograph the food using a camera (S1520).

The cooking apparatus may transmit a photographed image of the cooked food to the user terminal device (S1530).

When the first feedback on the photographed image is received, the cooking apparatus may provide a plurality of images for receiving the selection of additional cooking states for the food to the user terminal device (S1540).

In addition, when the second feedback for the photographed image is received, the cooking apparatus may provide a plurality of menus for analyzing the cause of the cooking state of the food to the user terminal device (S1550).

Hereinafter, an embodiment of acquiring a three-dimensional image of food using a laser device according to an embodiment of the disclosure will be described with reference to FIGS. 16 to 18.

Figure 16:
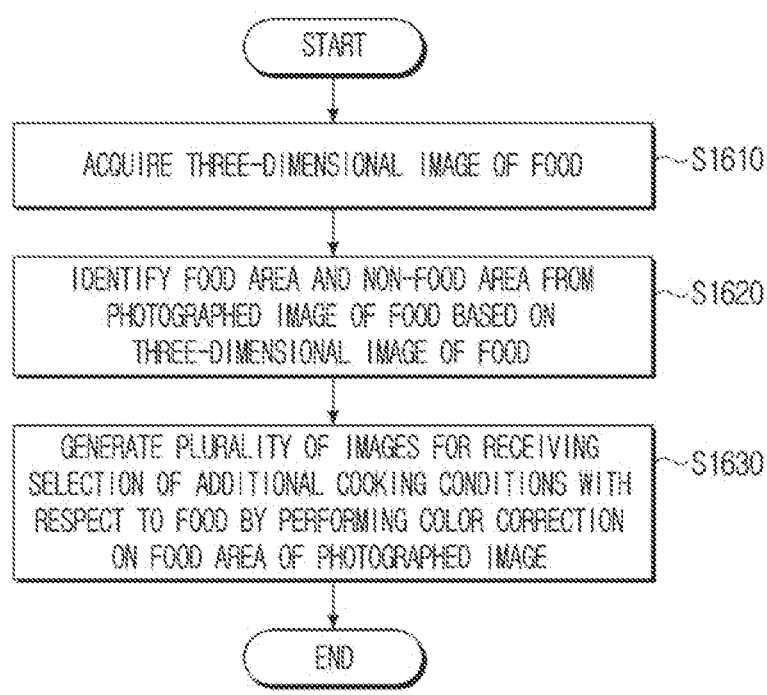
FIG. 16 is a flowchart for illustrating an embodiment of acquiring a 3D image of food in a cooking apparatus according to an embodiment.
Figure 17:
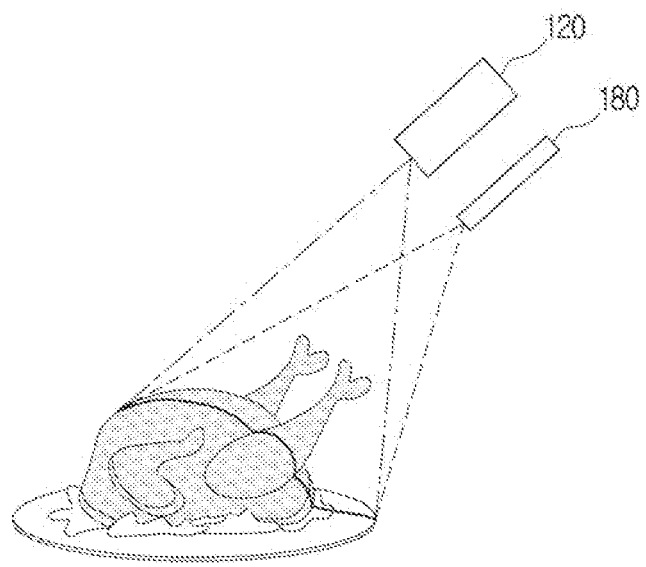
FIG. 17 is a view illustrating an embodiment of acquiring a three-dimensional image of food using a camera and a laser device.
Figure 18:
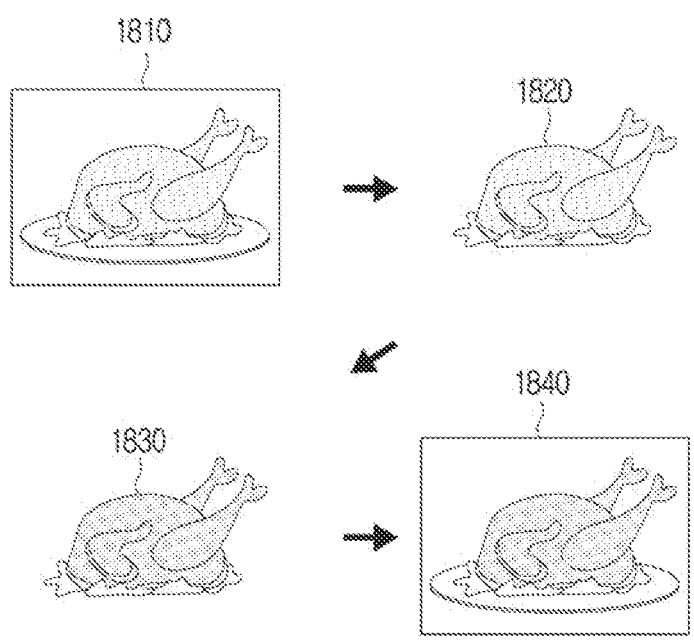
FIG. 18 is a view illustrating an embodiment in which a food area and non-food area are identified from a photographed image of food and color correction is performed only on the food area.

FIG. 16 is a flowchart for illustrating an embodiment of acquiring a 3D image of food in a cooking apparatus according to an embodiment, FIG. 17 is a view illustrating an embodiment of acquiring a three-dimensional image of food using a camera and a laser device, and FIG. 18 is a view illustrating an embodiment in which a food area and non-food area are identified from a photographed image of food and color correction is performed only on the food area.

Referring to FIG. 16, the cooking apparatus may include acquiring a three-dimensional image of food (S1610), identifying food area and a non-food area from the photographed image of the food based on the three-dimensional image of the food (S1620), and generating a plurality of images for receiving selection of additional cooking states for food by performing color correction on the food area of the photographed image (S1630).

The cooking apparatus may acquire a 3D image of the food (S1610). In that configuration, the cooking apparatus may acquire a three-dimensional image of the food based on an image photographed by the camera 120 with a linear laser irradiated toward the food through the laser device 180.

Referring to FIG. 17, when the laser device 180 irradiates a linear laser toward the food, the linear laser irradiated onto the food may be formed in a curved shape according to a curvature of a surface of the food. The cooking apparatus may rotate the food by driving the cooking chamber, and thus the food may be rotated 360 degrees and acquire a three-dimensional image of the food by photographing the shape of the irradiated laser through the camera 120.

Specifically, the processor 150 may acquire three-dimensional spatial coordinates, for example, coordinates for X-axis, Y-axis, and Z-axis with respect to a plurality of areas on the photographed linear laser.

In that configuration, the processor 150 may identify a area having a height value of 3D spatial coordinates, for example, a Z-axis coordinate value of 0 among a plurality of areas on the photographed linear laser as a non-food area. Here, a height value with respect to a bottom surface of the cooking chamber may be set to 0. Also, the processor 150 may identify an area having a non-zero height value among the plurality of areas on the photographed linear laser as food area.

Meanwhile, the processor 150 may increase an accuracy of distinguishing the food area from the non-food area by additionally considering the photographed image of the food. Specifically, the processor 150 may acquire a color value of food corresponding to each of the plurality of areas by matching a position of each of the plurality of areas on the photographed linear laser with a position at the photographed image of the food. In other words, the color value (e.g., RGB value) of the surface of the food to which the linear laser is irradiated may be acquired. The processor 150 may identify an area having a color value within a predetermined range among areas having a height value of 0 among a plurality of areas on the photographed linear laser as food area by comparing the area to an area having a non-zero height value. Accordingly, in view of the color value of the surface of the food, even an area having a color similar to the color of the food may be identified as the food area.

A laser irradiation direction of the laser device 180 and a photographing direction of the camera 120 may be arranged to form a predetermined angle.

Also, the cooking apparatus may include identifying food area and a non-food area from the photographed image of the food based on the three-dimensional image of the food (S1620), and generating a plurality of images for receiving selection of additional cooking states for food by performing color correction on the food area of the photographed image (S1630).

In that configuration, the cooking apparatus may match the three-dimensional image of the food and the photographed image of the food to identify an inside of an outer part area of the food identified from the photographed image as the food area.

Referring to FIG. 18, the processor 150 may match the photographed image 1810 acquired by photographing the food with the three-dimensional image of the food, and identify the outer part area of the food from the photographed image 1810, and identify the inside of the outer part area as the food area 1820. The processor 150 may generate an image 1830 in which color correction is performed on the identified food area. In other words, in the case of the roasting food as shown in FIG. 7, an image of the food according to a result expected when additional cooking is performed may be provided to the user step by step by differently correcting a degree of browning according to additional cooking through color correction of the photographed image of the food. In other words, an image 1840 for receiving selection of additional cooking states for food may be generated. Accordingly, the user may intuitively identify a desired degree of additional cooking. Although generation of one image is illustrated in FIG. 18, a plurality of images according to a cooking step may be provided as shown in FIG. 5.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A cooking apparatus comprising:
   a cooking chamber configured to accommodate food;
   a camera configured to photograph inside of the cooking chamber;
   a laser device configured to irradiate a laser toward the food;
   a communication interface;
   a memory configured to store a cooking method; and
   a processor configured to:

based on a selection related to food being selected, drive the cooking chamber based on a cooking method corresponding to the selection related to food, control the camera to photograph the food inside the cooking chamber, and control the communication interface to transmit a photographed image of the food to a user terminal device, based on a first feedback corresponding to a menu selection requesting additional cooking of the food related to the photographed image being received, provide a plurality of images for selecting additional cooking states for the food to the user terminal device, and based on a second feedback corresponding to a menu selection notifying a cooking failure of the food related to the photographed image being received, provide a plurality of menus to the user terminal device through which a selection is entered, wherein based on the selection from the plurality of menus being entered, a cause of a cooking state of the food is analyzed, wherein the processor is configured to acquire a three-dimensional image of the food using the camera and the laser device, based on the three-dimensional image of the food, identify a food area from the photographed image of the food, and perform color correction on the food area of the photographed image to generate the plurality of images.

2. The cooking apparatus of claim 1, wherein the processor is configured to:

based on the first feedback being received, control driving of the cooking chamber to perform additional cooking according to a cooking state among the additional cooking states corresponding to a selected image among the plurality of images provided to the user terminal device being selected.

3. The cooking apparatus of claim 1, wherein the processor is configured to:

based on the second feedback being received, update information stored in the memory based on a menu among the plurality of menus provided to the user terminal device being selected.

4. The cooking apparatus of claim 3, wherein the update comprises at least one of updates for correcting at least one of a cooking time, a cooking temperature, and a cooking pattern included in the cooking method and an update for generating a notification message to be provided at a time of next cooking.

5. The cooking apparatus of claim 1, wherein the processor is configured to:

control driving of the cooking chamber to stop based on a third feedback related to the photographed image being received.

6. The cooking apparatus of claim 1, further comprising:
a display; and
an input device configured to receive user feedback,
wherein the processor is configured to:
control the display to display the photographed image, and control the display to, based on the first feedback being inputted through the input device, display the plurality of images for selecting among the additional cooking states for the food, and based on the second feedback being inputted through the input device, display the plurality of menus for analyzing the cause for the cooking state of the food.

7. The cooking apparatus of claim 6, wherein the processor is configured to, based on the first feedback being inputted, control driving of the cooking chamber to perform additional cooking according to one of the additional cooking states corresponding to the selected image based on one of the plurality of images displayed on the display being selected.

8. The cooking apparatus of claim 6, wherein the processor is configured to, based on the second feedback being received, update information stored in the memory based on a menu among the plurality of menus displayed on the display being selected.

9. The cooking apparatus of claim 1, wherein the memory is configured to store a plurality of reference images indicating different cooking levels and a cooking method matching each of the plurality of reference images for each food, and wherein the processor is configured to provide the plurality of reference images to the user terminal device, update, based on one of the plurality of reference images being selected, a cooking method stored in the memory according to a cooking level corresponding to the selected reference image, and control the cooking chamber based on the cooking method corresponding to the selected reference image.

10. The cooking apparatus of claim 1, wherein the processor is configured to:

based on an image, photographed by the camera, of a linear laser irradiated toward the food through the laser device, acquire three-dimensional spatial coordinates with respect to each of a plurality of areas on the photographed linear laser, and identify an area in which a height value of the three-dimensional spatial coordinate is 0 among the plurality of areas as a non-food area, and identify an area with a non-zero height value as a food area.

11. The cooking apparatus of claim 10, wherein the processor is configured to:

acquire a color value of food corresponding to each of a plurality of areas on the photographed linear laser based on the image photographed by the camera, and compare with an area with a non-zero height value among areas in which the height value of the three-dimensional spatial coordinate is 0, and identify an area where color value is within a predetermined range as a food area.

12. The cooking apparatus of claim 1, wherein the processor is configured to:

match the three-dimensional image of the food and the photographed image of the food and identify an inside of an outer part area of the food identified from the photographed image as the food area.

13. A user terminal device comprising:
a memory configured to store an application for controlling a cooking apparatus comprising a camera for photographing inside of a cooking chamber;
a display;
a communication interface; and
a processor configured to:
based on the application being executed, control the display to display a food selection User Interface (UI) for receiving an input related to food to be cooked in the cooking apparatus, and control the communication interface to transmit a control signal corresponding to the input related to the food from the food selection UI to the cooking apparatus, based on a photographed image of the food being received from the cooking apparatus, control the display to display a plurality of menus for receiving input related to the photographed image and feedback related to the photographed image, and based on at least one menu among the plurality of menus being selected, transmit feedback corresponding to the least one menu selected menu to the cooking apparatus, based on a first menu is selected transmit a first feedback on the photographed image to the cooking apparatus, and based on a second menu is selected, transmit second feedback on the photographed image to the cooking apparatus, wherein the plurality of menus include the first menu for requesting additional cooking of the food, the second menu for notifying a cooking failure of the food, and a third menu for notifying a cooking success of the food, the second menu enables a selection to be entered and based on the selection through the second menu being entered, a cause of a cooking state of the food is analyzed, wherein the photographed image is an image on which color correction for a food area is performed, based on a three-dimensional image acquired using the camera and a laser device included in the cooking apparatus.

14. A method of controlling a cooking apparatus comprising a camera for photographing inside of a cooking chamber and a laser device for irradiating a laser toward food, the method comprising:

based on a selection related to food, driving the cooking chamber according to a cooking method corresponding to the selection related to food;

photographing the food inside the cooking chamber using the camera;

transmitting a photographed image of the food to a user terminal device;

based on a first feedback corresponding to a menu selection requesting additional cooking of the food related to the photographed image being received, providing a plurality of images for receiving selection of additional cooking states with respect to the food to the user terminal device; and based on a second feedback corresponding to a menu selection notifying a cooking failure of the food related to the photographed image being received, providing a plurality of menus to the user terminal device through which a selection is entered, wherein based on the selection from the plurality of menus being entered, a cause of a cooking state of the food is analyzed, wherein providing the plurality of images for selecting additional cooking further comprises:

acquiring a three-dimensional image of the food using the camera and the laser device;

based on the three-dimensional image of the food, identifying a food area from the photographed image of the food; and performing color correction on the food area of the photographed image to generate the plurality of images.

* * * * *